(12) United States Patent
Yin et al.

(10) Patent No.: US 9,183,153 B2
(45) Date of Patent: Nov. 10, 2015

(54) METHOD AND SYSTEM FOR MANAGING POWER GRID DATA

(71) Applicants: Jian Yin, Richland, WA (US); Bora A. Akyol, Richland, WA (US); Ian Gorton, Pittsburgh, PA (US)

(72) Inventors: Jian Yin, Richland, WA (US); Bora A. Akyol, Richland, WA (US); Ian Gorton, Pittsburgh, PA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 232 days.

(21) Appl. No.: 13/773,816

(22) Filed: Feb. 22, 2013

(65) Prior Publication Data

US 2013/0297868 A1 Nov. 7, 2013

Related U.S. Application Data

(60) Provisional application No. 61/643,052, filed on May 4, 2012.

(51) Int. Cl.
| | |
|---|---|
| G06F 12/00 | (2006.01) |
| G06F 12/08 | (2006.01) |
| G06F 12/02 | (2006.01) |
| G06F 3/06 | (2006.01) |
| G11B 27/11 | (2006.01) |
| G11B 27/32 | (2006.01) |

(52) U.S. Cl.
CPC .............. *G06F 12/0866* (2013.01); *G06F 3/06* (2013.01); *G06F 12/023* (2013.01); *G06F 12/0246* (2013.01); *G11B 27/11* (2013.01); *G11B 27/329* (2013.01); *G06F 12/0886* (2013.01); *G11B 2220/2516* (2013.01); *G11B 2220/65* (2013.01)

(58) Field of Classification Search
None
See application file for complete search history.

(56) References Cited

U.S. PATENT DOCUMENTS

| | | | |
|---|---|---|---|
| 2003/0237024 A1 | 12/2003 | Ogawa et al. | |
| 2011/0239013 A1* | 9/2011 | Muller | 713/320 |
| 2013/0103657 A1 | 4/2013 | Ikawa et al. | |

FOREIGN PATENT DOCUMENTS

WO 2011142026 A1 11/2011

OTHER PUBLICATIONS

Yin, J., et al., Scalable Real Time Data Management for Smart Grid, Proceedings of the Middleware 2011 Industry Track Workshop (Middleware '11), Lisbon, Portugal, Dec. 31, 2011.*
Mendel Rosenblum and John K. Ousterhout, The Design and Implementation of a Log-Structured File System, Jul. 24 1991, Proceedings of the 13th ACM Symposium on Operating Systems Principles.*
Decandia, G., et al., Dynamo: Amazon's Highly Available Key-value Store, Proceedings of 21st ACM SIGOPS symposium on operating systems principles, Oct. 14-17, 2007, Stevenson, WA.
Nieplocha, J., et al., A Parallel WLS State Estimator on Shared Memory Computers, Proceedings of the 8th International Power Engineering Conference, IPEC 2007, Piscataway, NJ, 395-400.

(Continued)

*Primary Examiner* — Shawn X Gu
(74) *Attorney, Agent, or Firm* — A. J. Gokcek

(57) ABSTRACT

A system and method of managing time-series data for smart grids is disclosed. Data is collected from a plurality of sensors. An index is modified for a newly created block. A one disk operation per read or write is performed. The one disk operation per read includes accessing and looking up the index to locate the data without movement of an arm of the disk, and obtaining the data. The one disk operation per write includes searching the disk for free space, calculating an offset, modifying the index, and writing the data contiguously into a block of the disk the index points to.

22 Claims, 8 Drawing Sheets

(56) References Cited

OTHER PUBLICATIONS

Huang, Z., Transforming Power Grid Operations via High Performance Computing, IEEE Power Engineering Society General Meeting, 2008, Pittsburgh, PA.

Cooper, B. F., et al., PNUTS: Yahoo!'s Hosted Data Serving Platform, Proceedings of PVLDB Endowment, Aug. 23-28, 2008, Aukland, New Zealand.

Gorton, I., et al., A High-Performance Hybrid Computing Approach to Massive Contingency Analysis in the Power Grid, Proceedings of the 2009 Fifth IEEE International Conference on e-Science, Dec. 9-11, 2009.

Huang, Z., et al., Massive Contingency Analysis with High Performance Computing, IEEE Power and Energy Society General Meeting, Jul. 26-30, 2009, Calgary, Canada.

Chang, F., et al., Bigtable: A Distributed Storage System for Structured Data, ACM Transactions on Computer Systems, vol. 26, No. 2, Article 4, Jun. 2008.

Rao, J., et al., Using Paxos to Build a Scalable, Consistent and Highly Available Datastore, Proceedings of the VLDB Endowment, vol. 4, No. 4, Aug. 29-Sep. 3, 2011, Seattle, WA.

Chen, Y., et al., An Advanced Decision-Support Tool for Electricity Infrastructure Operations, in Critical Infrastructure Protection IV, IFIP Advances in Information and Communication Technology, vol. 342, No. 2010, ed. T. Moore and S. Shenoi, 245-260.

Huang, Z., et al., Improving Small Signal Stability through Operating Point Adjustment, Proceedings of the 2010 IEEE Power and Energy Society General Meeting.

Tomsovic, K., et al., Designing the Next Generation of Real-Time Control, Communication, and Computations for Large Power Systems, IEEE Proceedings, vol. 93, No. 5, May 2005, 965-979.

Van Renesse, R., et al., Chain Replication for Supporting High Throughput and Availability, Proceedings of the 6th Conference on Symposium on Operating Systems Design & Implementation, Dec. 6-8, 2004, San Francisco, CA.

Vogels, W., Eventually Consistent, Communications of the ACM, vol. 52, No. 1, Jan. 2009.

Beaver, D., et al., Finding a Needle in a Haystack: Facebook's Photo Storage, Proceedings of the 90th USENIX Confedrence on Operating Systems Design and Implementation, Oct. 4-6, 2010, Vancouver, BC, Canada.

Debnath, B., et al., FlashStore: High Trhoughput Persistent Key-Value Store, Proceedings of the VLDB Endowment, vol. 3, No. 2, Sep. 2010.

Debnath, B., et al., SkimpyStash: RAM Space Skimpy Key-Value Store on Flash-Based Storage, Proceedings of the 2011 International Conference on Management of Data, Jun. 12-16, 2011, Athens, Greece.

Chi, Y., et al., SLA-Tree: A Framework for Efficiently Supporting SLA-Based Decisions in Cloud Computing, Proceedings of the 14th International Conference on Extending Database Technology, Mar. 21-24, 2011, Uppsala, Sweden.

Chen, G., et al., A Framework for Supporting DBMS-like Indexes in the Cloud, Proceedings of 37th International Conference on Very Large Databases, Aug. 29-Sep. 3, 2011, Seattle, WA.

Cudre-Mauroux, P., et al., A Demonstration of SciDB: A Science-Oriented DBMS, Proceedings of the VLDB Endowment, vol. 2, No. 2, Aug. 24-28, 2009, Lyon, France.

Sleator, D. D., et al., Self-Adjusting Binary Search Trees, Jouirnal of the Association for Computing Machinery, vol. 32, No. 3, Jul. 1985, 652-686.

Ghemawat, S., et al., The Google File System, SIGOPS Operating System Review, Rev. 37, 5, Oct. 19-22, 2003, Bolton Landing, New York.

International Search Report/Written Opinion for International Application No. PCT/US2013/027565, International Filing Date Feb. 25, 2013 Date of Mailing May 24, 2013.

* cited by examiner

METHOD AND SYSTEM FOR MANAGING POWER GRID DATA

CROSS-REFERENCE TO RELATED APPLICATIONS

This application claims priority to U.S. Provisional Application Ser. No. 61/643,052, filed May 4, 2012, titled "A METHOD OF MANAGING DATA FOR SMART GRIDS," hereby incorporated by reference in its entirety for all of its teachings.

STATEMENT REGARDING FEDERALLY SPONSORED RESEARCH OR DEVELOPMENT

The invention was made with Government support under Contract DE-AC05-76RLO1830, awarded by the U.S. Department of Energy. The Government has certain rights in the invention.

TECHNICAL FIELD

This invention relates to data management. More specifically this invention relates to data management middleware architecture for power grid data.

BACKGROUND OF THE INVENTION

Smart grids promise to improve the efficiency of power grid systems and reduce greenhouse emissions through incorporating power generation from renewable sources and shaping demands to match the supply. Renewable sources include solar or wind. Power generation from these sources is affected by weather factors that can be highly fluctuating. To ensure these energy sources can be utilized efficiently, smart grid systems often shape demand through incentive to match the supply. As a result, the whole system becomes highly dynamic and requires constant adjusting. How to adjust the system can have a great impact on the efficiency and reliability of power grid systems, which offer many opportunities for innovation. In our previous work, we have identified and developed several applications that can be used to optimize power grid operations.

However, these applications rely on the precise estimation of the state of power grid systems. To enable precise estimate of power grid, enormous amount of data from millions of sensors from power grid must be used. Moreover, the relevant data must be delivered to applications within real time constraints. Even though millions of sensors such as phase measurement units (PMU) and smart meters are being widely deployed over the Internet, there does not exist a software system that can collect, store, retrieve, and deliver these amount of data in real time.

Most existing data middleware are either designed for small scale application or built on top of high level system software and APIs. Much indirection is introduced into these systems, which can cause both high overhead and unpredictability due to alternative execution path. For instance, to allow arbitrary insert, deletion, and modifications, the metadata block has to be traversed—and possible several levels of indirection blocks—before data can be accessed.

Other works have been carried out both in research community and commercial world to provide better means to monitor and control power grids. Most of the efforts are targeted towards scalability and Quality of Service (QoS). GridStat is a middleware that provides higher-level abstractions for programmer to develop applications for power grid monitoring. It allows for interoperability across different operating systems, network technologies, programming languages, computer architectures, and even across different vendors' middleware frameworks. It is a specialization of publish-subscribe architecture with use of status variables to provide optimized efficiency. These status variables are provided to publish-subscribers with specified quality of service (QoS) requirements, including timeliness, redundant paths, and computer security. It also provides its interfaces using CORBA, a widely utilized middleware standard. However, GridStat does not provide real time data ingestion and retrieval capability and thus it can only be used for current data instead of historical data.

There are some efforts towards a cyber-enabled energy management system (EMS) and supervisory control and data acquisition (SCADA), with modular components and trustworthy middleware and heterogeneous distributed energy sources (DERs) added to future power grids, which will control and manage energy generation, transmission, and distribution. The information network, including traditional EMS and SCADA, carries out multi-scale networked sensing/processing, communicates distilled information across the grid, and facilitates the closing of a large number of loops in real-time, so that actions are appropriately taken in a timely manner to ensure overall reliability and performance However, those systems cannot scale up to handle millions of sensors as in future smart grids.

More recent work includes the design of large scale data middleware. For instance, Ghemawatt et. al, *Sanjay Ghemawat, Howard Gobioff, and Shun-Tak Leung*. 2003. *The Google file system*. SIGOPS Oper. Syst. Rev. 37, 5 (October 2003), 29-43, proposed Google file system, a distributed file system that stress scalability and fault tolerance. Beaver et. al., Doug Beaver, Sanjeev Kumar, Harry C. Li, Jason Sobel, and Peter Vajgel. 2010. *Finding a needle in Haystack: facebook's photo storage*. In Proceedings of the 9th USENIX conference on Operating systems design and implementation (OSDI'10), 1-8, Vancouver, BC, Canada, 2010, reported Facebook's phone storage and retrieval system that can store petabytes of phone and support millions of stores and retrievals. However, these systems do not provide real time guarantees.

SciDB entails an attempt for a DBMS based solution that would meet the need of scientific uses and increasingly data rich science. It presents specification of a nested array data model based system, which provides "No-overwrite" storage and supports science specific primitive operation as regid and provenance. It uses multidimensional, nested array model with array cells containing records, which in turn can contain components that are multi-dimensional array. It also supports user-defined functions coded in C++, which can be used as an operator on data. These updatable arrays have a history dimension which keeps track of modification history of data to provide provenance. It uses a partitioning which changes over times to support applications where data ingest is not uniform over times—i.e. first partitioning scheme is used for time less than T and second partitioning scheme is used for time greater than T. It also stores self-describing data format so that it can operate on in site data without requiring a load process. SciDB does not tailor its design to power grid data and thus cannot meet the scalability and real time requirements of smart grid applications.

SUMMARY OF THE INVENTION

In one embodiment of the present invention, a method of managing data for smart grids is disclosed. The method includes collecting data from a plurality of sensors. The method also includes modifying an index for a newly created block. The method further includes performing a single disk operation per read or write.

In one embodiment, the data is collected in a time series format.

The index may include a look-up capability and can be stored in at least one of the following: main memory of a local machine; main memory from a remote machine; a solid-state storage device (SSD) from the local machine; and the SSD from the remote machine.

A one-disk operation per read includes accessing and looking up the index to locate the data without movement of an arm of the disk, and obtaining the data. A one-disk operation per write includes searching the disk for free space, calculating an offset, modifying the index, and writing the data contiguously into a block of the disk the index points to.

In one embodiment, the data is first written into a main memory buffer before being written into the disk.

In one embodiment, collecting data from a plurality of sensors further includes organizing the data contiguously in the disk. The data may be reorganized contiguously in main memory before being written into the disk.

In one embodiment, the method further includes estimating the number of disk operations and staying below a maximum storage capacity. The method can also include distributing the data into multiple disks to enhance efficiency and reliability.

The data can be, but is not limited to, power grid data.

In another embodiment of the present invention, a system for scalable real time data management for smart grids is disclosed. The system includes data collected from a plurality of sensors. The system also includes an index for data retrieval via one disk access, and a disk including data blocks for storage of the data. The system further includes a device for caching data, wherein the index is stored in the device.

In another embodiment of the present invention, a method of managing data for smart grids is disclosed. The method includes collecting data from a plurality of sensors; organizing the data contiguously in a disk; modifying an index for a newly created block; adding a look-up capability to the index; and estimating the number of disk operations and staying below a maximum storage capacity. The data is collected in a time series format and first written into a main memory buffer before being written into the disk.

DETAILED DESCRIPTION OF THE PREFERRED EMBODIMENTS

The present invention is directed to systems and methods of managing data for smart grids. The system provides, among other things, predictable real time performance for ingesting, collecting, storing, retrieving, and delivering power grid sensor data to applications. Also, since the system includes hardware and software components, partial failures are avoidable. Thus, the system handles partial failures without service interruption.

The system may be designed to leverage both high-end hardware as well as commodity hardware. While high end users can pay the cost of high-end hardware for performance, low end users can choose their desirable tradeoff between cost and performance. Multiple low-end machines can be used in place of one high-end machine. A scalable real time data middleware of the present invention can meet these design conditions.

By tailoring the design of the system to the specific characteristics of power grid data and applications, overhead and unpredictability associated with indirection in high level system interfaces can be reduced without introducing much complexity in implementing with low level system interfaces. Power grid data are characterized with frequent insertion, less frequent deletion, and rare updates. Moreover, the power grid data are often highly structured and may be inserted into the system of the present invention with temporal locality.

In one embodiment, the data are written directly to a block device through a block device interface. This eliminates indirection, high overhead, and unpredictability associated with high level system interfaces in which one access can lead to multiple disk accesses for reading an inode block, reading a variable number of an indirect block, and reading the data block itself. Data structures of the present invention were designed to keep track of data and free space in the storage devices. By leveraging the fact that data are often inserted in temporal order, the metadata can be minimized to the point that it can be kept in the main memory. Hence, in one embodiment, a data insertion is translated into only one disk access. The system allows customized index for data retrieval. Local main memory, SSD, and remote main memory can be aggregated to enable most metadata lookups to occur in the types of memory that support random access. Data retrieval overhead can be reduced to one disk access in many cases.

Figure 1:
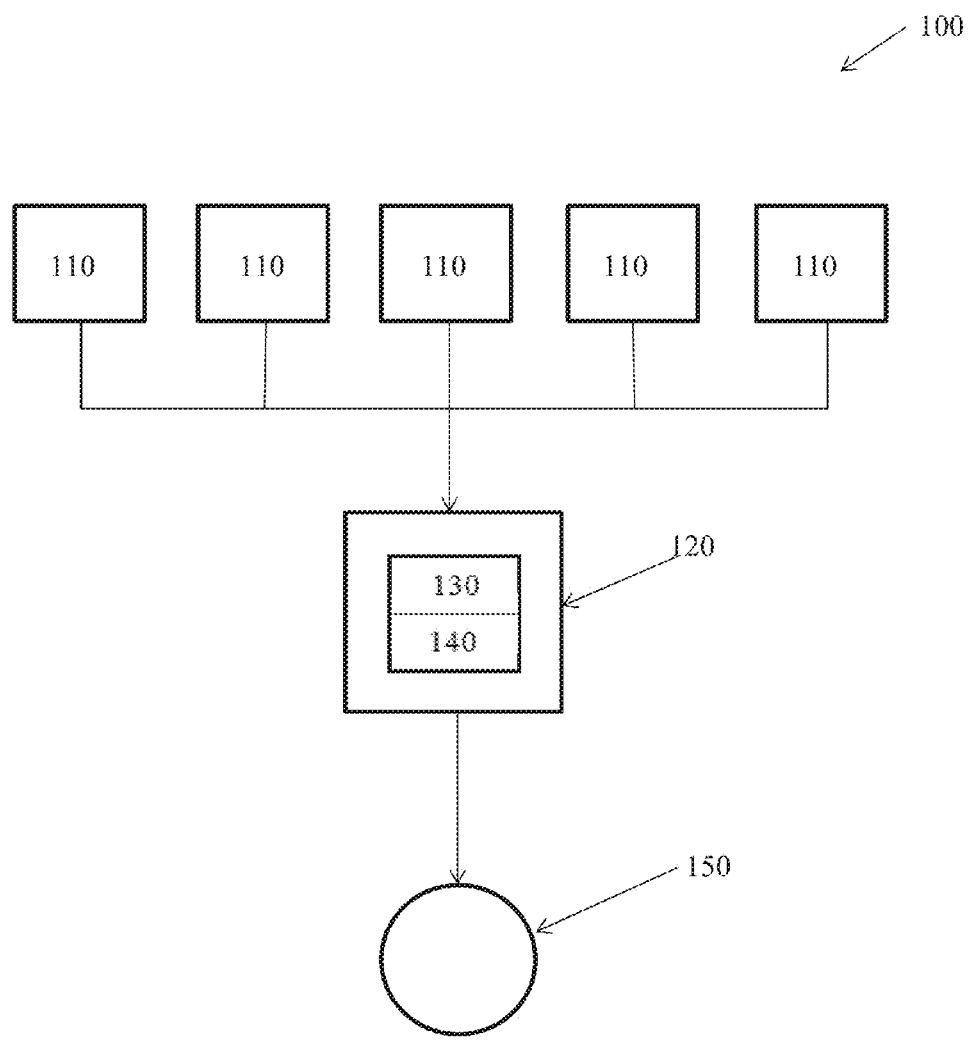
FIG. 1 illustrates a block diagram of a system for scalable real time data management for smart grids, in accordance with one embodiment of the present invention.

In one embodiment, as shown in the system 100 of FIG. 1, data is received from a plurality of sensors 110, including phasor measurement units (PMUs) and smart meters. These sensors 110 are deployed across a smart grid system. As the data is received in a device 120 for caching data, it is initially collected or stored into a main memory buffer 140. The data is broken up and organized into different blocks and then written into a disk 150. The data may be organized contiguously, for high locality, in the disk. The device also includes an index 130.

A block is a chunk of data, and the disk stores data by acting as a container for the block of data. The disk is equivalent to a block device and allows a user to read or write to a block. The index, which is preferably located in the main memory, points to where the data is located and is used for data retrieval. Optionally, the index can also be located in a solid-state drive (SSD) or the disk, for persistency, in case power is lost. The index can include a look-up capability In one embodiment, the method also includes a one disk operation per write. The one disk operation per write includes searching the disk for free space, calculating an offset, modifying the index, and writing the data contiguously into a block of the disk the index points to. Only one mechanical operation is needed to write data or read a block of data.

Figure 2:
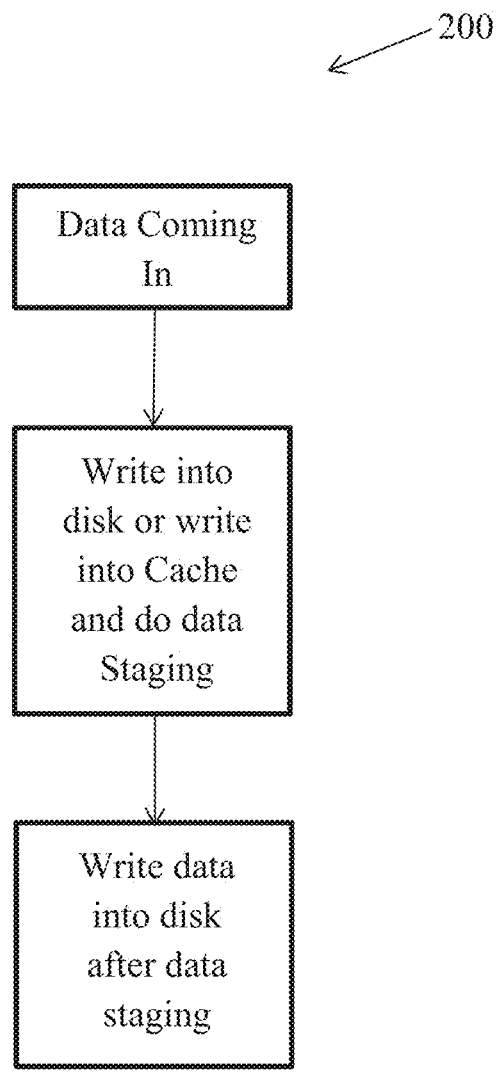
FIG. 2 illustrates a flow chart for ingesting time-series data using the system of FIG. 1, in accordance with one embodiment of the present invention.

In another embodiment, a method of ingesting or writing data is shown in the flow chart 200 of FIG. 2. As the data is being acquired at 210, it is either written into the disk directly or into cache at 220 where the data is staged. At 230, the data is written into the disk after staging.

Figure 3:
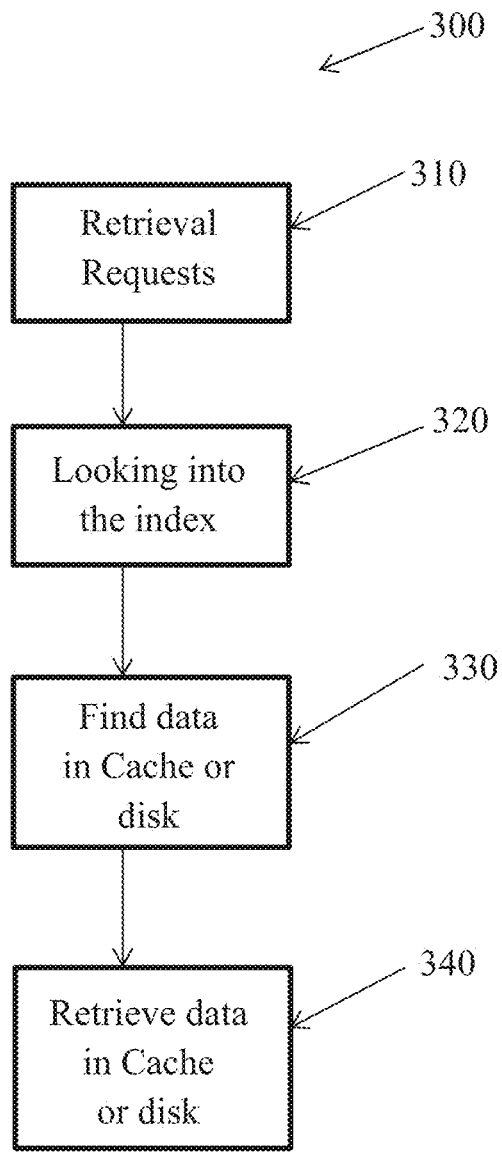
FIG. 3 illustrates a flow chart for retrieving time-series data using the system of FIG. 1, in accordance with one embodiment of the present invention.

In one embodiment, the method includes a one disk operation per read, as shown in the flow chart 300 of FIG. 3. In the chart 300, a retrieval request at 310 occurs. Then, the one disk operation per read includes accessing and looking up the index at 320 to locate the data at 330 without movement of an arm of the disk, and accessing the data at 340.

A distributed, high performance, parallelizable storage system is disclosed, with power systems in mind The system takes advantage of the common data format that PMU's and other sensors generate in a power system, and utilize this knowledge to store data in an efficient manner. This factor enables one to concentrate on storing one type of data and customizing the system to work in efficient space, time complexity.

In one embodiment, the system ingests and retrieves power grid data with real time guarantees. First, the system ingests data at a rate that can keep up with the enormous number of sensors. Smart grid systems can have millions of smart meters and PMUs. These sensors can generate data at a high rate. For instance, PMU's can generate measurements at a rate ranging from thirty measurements per second to several hundred per second. Second, it retrieves data in the order of milliseconds. Delivering data to applications is only one step among many steps in adjusting power grids to achieve efficiency and reliability. Other steps can include carrying out real time high performance state estimations and optimizing the control decisions, which can take quite some time. In many scenarios, such as synchronizing the phase of power, the control cycle must be in the order of tens millisecond because power frequency is 60 Hz. Therefore, the latency of data delivery should be as small as possible. Furthermore, the latency should also be predictably small. The system achieves high ingestion rates through access to storage devices as directly as possible. The system also parallelizes the load among several machines and achieves real time data retrieval by minimizing disk block access and exploiting specialized and compressed indexes.

The system can ingest data streamed from sensors or data segments from some intermediate processing of sensor data. The general format of PMU data consists of values, measured by sensor, over a period of time. The sensor values are measured by PMU—such as voltage, frequency, and current—periodically and the corresponding timestamp is recorded. Each record may consist of a timestamp, and series of values. This data is collected by a PDC collection unit which sends the block of collected data to the system. This block of data can be seen as a series of values, which can be represented using a two-dimensional array. Before data can be ingested, queries are made to the admission control part of the system to ensure that QoS guarantees can be made. After that, the data is broken into chunks to be written to block devices. Chunk size is one of the important design parameters. While using small chunk sizes can reduce wasted space due to internal fragmentation, it can increase the overhead to keep track of these chunks. This problem is addressed by keeping data in temporal order on storage device. This is possible because of the special characteristics of Power Grid data. The data usually comes in temporal order and this is also the order in which the data can be stored for efficient processing. Hence for each two dimensional array of values that is to be stored on the disk, the need to store the first column, i.e. timestamp, is eliminated; just the starting value and difference for the timestamps are stored. Using this information the record for a given timestamp can be randomly accessed. This reduces the data block stored by the middleware to a series of values. Storing temporal closed data chunks together allows the beginning and end of sensor data—and the corresponding chunk indexes—to be stored instead of every chunk, which can significantly reduce the metadata to keep track of data stored in the system.

Main memory is used for keeping track of storage system metadata, specialized index for data retrieval, in addition to caching data. The storage metadata include the metadata to keep track of stored data as well as an efficient data structure for keeping track of and looking up free storage devices. The system estimates how to best partition the main memory for these uses. Users can also provide hints based on their knowledge of the workloads. Facilities can be provided to actively monitor the system online to gather statistics to adjust system configuration.

The system can be layered upon other systems and applications. One option is to use high-level system interfaces, such as file APIs, to provide high-level functions such as inserting, deleting, and updating data contained in a file and storage management system. A block device layer is used to eliminate overhead and unpredictability associated with file APIs. Additionally, based on the special characteristics of power grid workloads, an index is built to further reduce the disk accesses to a constantly low number. As disk blocks are being directly accessed, without any operating system intervention, the system will be responsible for keeping track of free and used blocks, and fragmentation. In one embodiment, two data structures are used to keep track of this data, the free list of the storage space and the data list. The free list is a doubly linked list that keeps track of the free chunks in the storage device that can used to store data. Since data are often inserted and deleted in order and rarely updated, the space in free list is often contiguous. Instead of tracking every chunk, the beginning and end of the free space is tracked to reduce the size of the free list. A similar approach is adopted for the data list. In one embodiment, each node in the linked list would look as follows:

```
class Mblock
{
public:
    //API Declarations
    //Private Members
private:
    loff_t start;
    uint64_t size;
};
```

Initially, when the system starts the data list could be empty, indicating that there is no data on the disk and the entire disk is free. As data blocks are written onto the disk, a free block from the disk, or free list, is fetched and nodes are added to the data list indicating the presence of data on the disk at that offset, with 'start' offset pointing to the beginning of data block on disk, and size storing the size of values stored on disk.

A search structure is implemented on top of the storage mechanism to search for a record in the blocks. Customized indexes are used to speed up date retrievals. Because random disk accesses can be orders of magnitude slower than main memory accesses, the system tries to minimize disk accesses for each data retrieval operation. In many cases the number of disk accesses can be reduced to one, which speeds up data retrieval operations and makes the data retrieval time predictable. This can provide real time QoS guarantees.

The special characteristics of power grid data as well as the characteristics of data retrieval workloads are leveraged to build an efficient index with small footprints. For instance, the specialized index for retrieving data is based on timestamps where index over time is built with a balanced tree. Even some amortized trees, such as splay trees, can provide better amortized performance Balanced trees may be used for predictable performance. A data structure of red-black tree has been developed which will help in the fast traversal of data block pointers and point to disk offsets in as fast a time as possible. To achieve real time performance, the index can be stored in at least one of the following: main memory of local machine; main memory from the remote machine; solid-state storage devices from local machine; and SSD from remote machines.

Initially, when the system starts, the tree is empty. As PMU records, including any time series data, are received and data blocks are written onto the disk, pointers are inserted to keep track of the timestamp and the disk blocks where the values are stored. Each node is an interval of time and the corresponding data location. One embodiment of the tree structure can be seen in the code below:

```
class NodeData {
    public:
    NodeData( );
    NodeData(NodeData *nd);
    NodeData(uint64_t startTime, uint16_t startUsec, uint64_t
endTime, uint16_t endUsec, loff_t offset, int count);
    //functions to be performed over a node
    ....
    //Functions/Operators that are being used by SplayTree
        NodeData& operator=(const NodeData &n);
        friend bool operator<(const NodeData &n, const NodeData &d);
        friend bool operator==(const NodeData &n, const NodeData &d);
        friend bool operator!=(const NodeData &n, const NodeData &d);
        friend ostream& operator<<(ostream& ost, const NodeData &n);
    //private members - Node properties
    private:
        uint64_t s_time;
        uint16_t s_usec;
        uint64_t e_time;
        uint16_t e_usec;
        loff_t offset;
        int count;
    };
```

A node in splay tree stores the starting timestamp, which is described by s_time, s_usec. To retrieve a piece of data, the tree is traversed until the leaf that has the interval containing the data is reached. From there the storage chunk which has the data is calculated, and one disk access allows data to be retrieved. This architecture describes, in one embodiment, the core of the data storage mechanism used by the system.

The system can aggregate resources from multiple machines. Efficient load distribution schemes are implemented to help ensure close to linear scale up. The system can scale up by using multiple machines. Multiple machines can be used to increase the storage capacity or provide higher aggregate processing power to handle high data retrieval workload.

Figure 4:
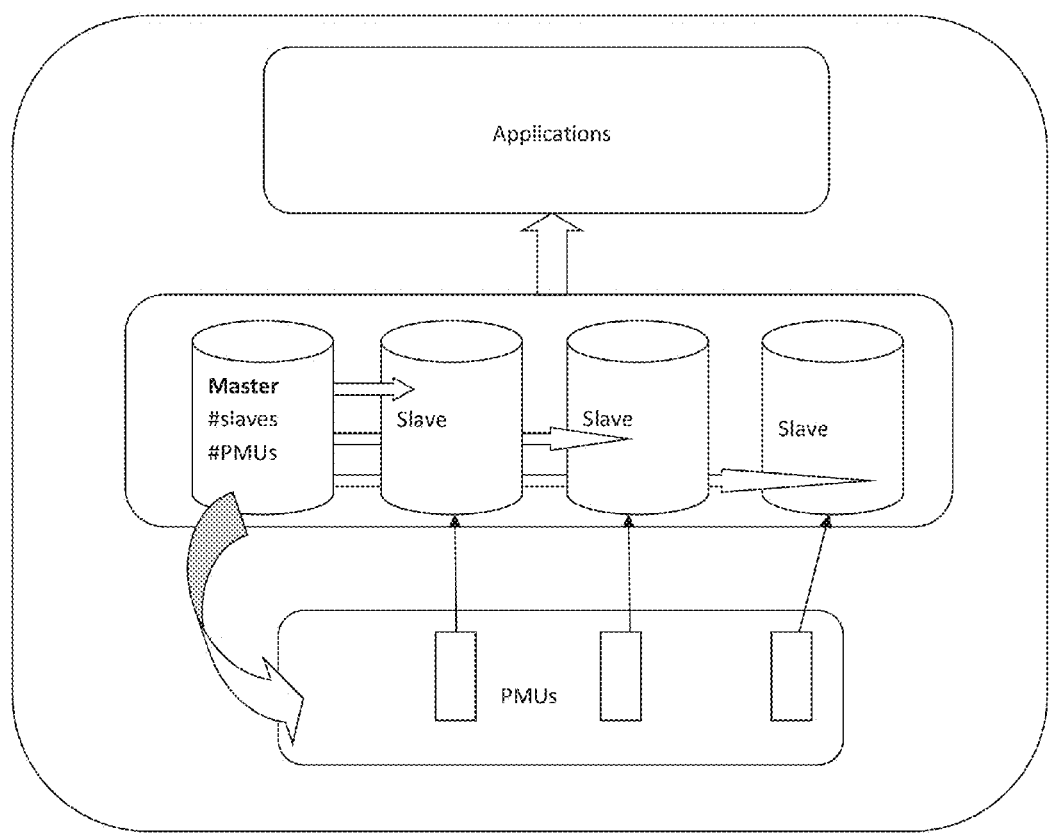
FIG. 4 illustrates a block diagram of system architecture for scalable real time data management for smart grids, in accordance with one embodiment of the present invention.

In one embodiment, as shown in FIG. 4, a master-slave architecture is used to build a distributed data storage system. The master is responsible for deciding which machine host's which data. The data distribution information is also replicated to clients so clients do not need to contact master every time to decide where to store or retrieve data. The consistency between clients and the master is maintained with soft state updates. Data location can be changed due to failure and recovery of slave nodes storing the data or load balancing after workload changes. The periodical updates are sends to clients from the master on the changing locations of data. Each slave machine is also maintaining the metadata on which data is stored with itself. Hence, if a slave node does not find the data requested by a client, it can inform the client that the data is not available with it. The client node can then query the master to determine the new location of the data and retrieve the data from the new location. The other location updates are also piggybacked to this query so client nodes can have up-to-data data location information before the next periodical updates from the master. The master can be replicated with distributed consensus to enhance fault tolerance of the system.

To help ensure that real time QoS guarantees are met, the system includes an admission control component. Users specify the amount of data to be ingested and the types and amount of data retrieval service that they need. Admission control will determine whether enough resources exist to satisfy the demand. If there are not enough resources, the admission control will first try to recruit additional machines. If additional machines cannot be allocated, the additional user request for service is rejected to ensure that QoS guarantees can be provided for previous accepted services.

The block based implementation of the system provides performance gains in terms of read/write speeds. In one embodiment, a local stand-alone software is developed which provides a set of APIs for a local program to read/write and search data on the local disk. This version of the program may be used an underlying component in the networked architecture of the system. With this version, the mean write times are equal to the time required to find a free block, write data in the free block, and add indexes to the newly created block. Mean read times involve finding the data which need to be read, reading it from the disk in the buffer, and returning the buffer to the user.

In a different version or embodiment, a networking layer is included over the core read/write functionality. This version of networking layer relies on TCP sockets to receive read/write requests.

For performance measurement, a SQL relational database, such as MySQL, running on a ubuntu server was used. SQL queries have been run on local machine treating it as a standalone service. This eliminates any network delays that might cause data transfer from one machine to another.

SQL performance is compared with a distributed version of the software. For performance testing, a set of sensor rings is inserted in SQL table. The number of values inserted is linearly increased from 2500, 5000, 12500, 25000, and so on, up to 75000. Essentially this means that many records are being inserted into the database. For measuring the time, the time is started after the SQL database connection is made and just before records are inserted, and then the top is stopped once the records are inserted into the table. The database is cleared after each write operation to obtain a uniform time.

Figure 5:
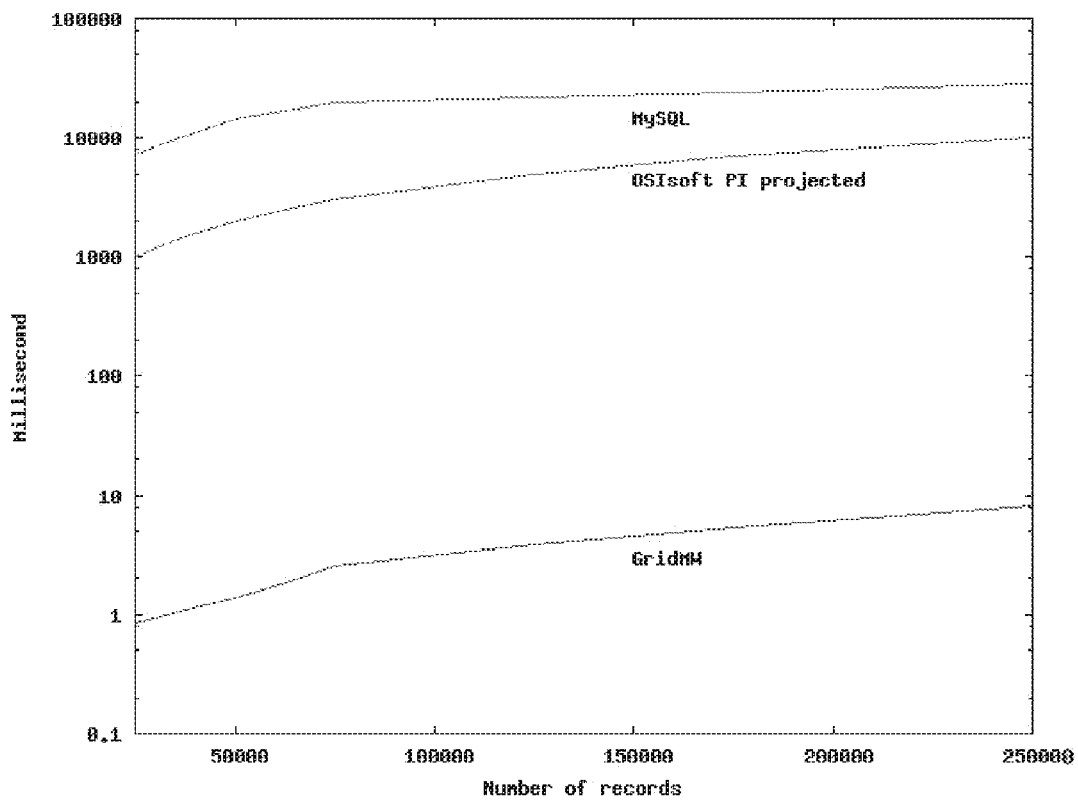
FIG. 5 is a graph showing data ingestion performance of one embodiment of the present invention compared to traditional systems.

Similarly, a set of values is inserted into the system. As mentioned above, there are at least two versions of the system—local and distributed over the network. For initial comparison, a distributed version of the system was used. This particular configuration contains one distribution server, which will receive the request from client to write a block of values to the disk. Two data servers are connected to the distribution server. Once the data is received, the distribution served divided the data into three part and sent the data to three different servers—which then store the data on their disks. All times are measured in microseconds. As can be seen from the graph of FIG. 5, the time required by the system to store data on the disk is much less than the time required by SQL to insert records into the database. The system is multiple orders of magnitude faster than SQL. With increase in the amount of data written onto the disk, the time more or less remains constant.

Figure 6:
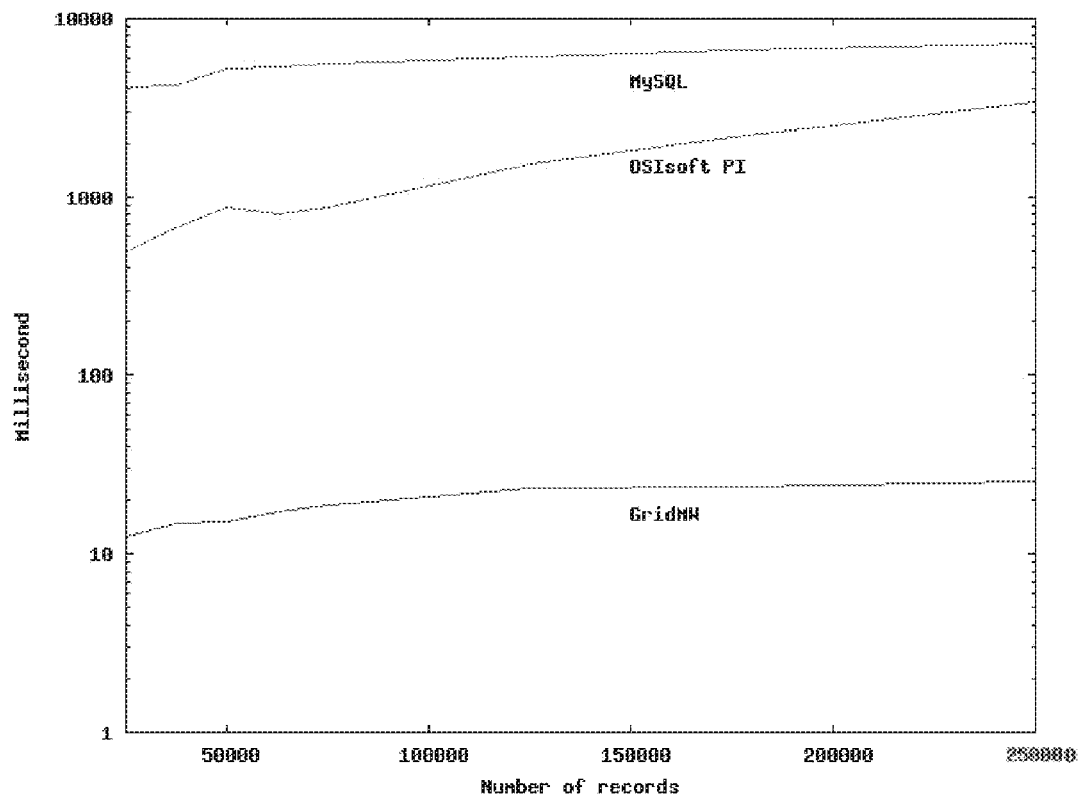
FIG. 6 is a graph showing data retrieval performance of one embodiment of the present invention compared to traditional systems.

Experiments were conducted to read a few records from the table. The number of records read were linearly increased from the disk/SQL table from 2500, 5000, 12500, and so on till 75000. For any measurements, the time should be measured under uniform circumstances. Hence, before performing any read/search operations, a number of records—approximately 120000—were written into the database/onto the disk. Measurements were taken of the time required to search particular records from the database/disk. That helps to ensure that the state of the database/disk is the same before every run. For each scenario time measurements are obtained five times, and then the average over that time is obtained. As can be seen from read time statistics of FIG. 6, the system significantly outperforms SQL database in terms of read time. There are a few fluctuations in time measurements, which might be attributed to caching.

Similar measurement of read/write times were taken for the local version of the system with one local data server, wherein all the data received from the client was stored onto it. These measurements were compared to the above mentioned distributed version of the system, which uses a configuration containing two data servers and one distribution server.

Figure 7:
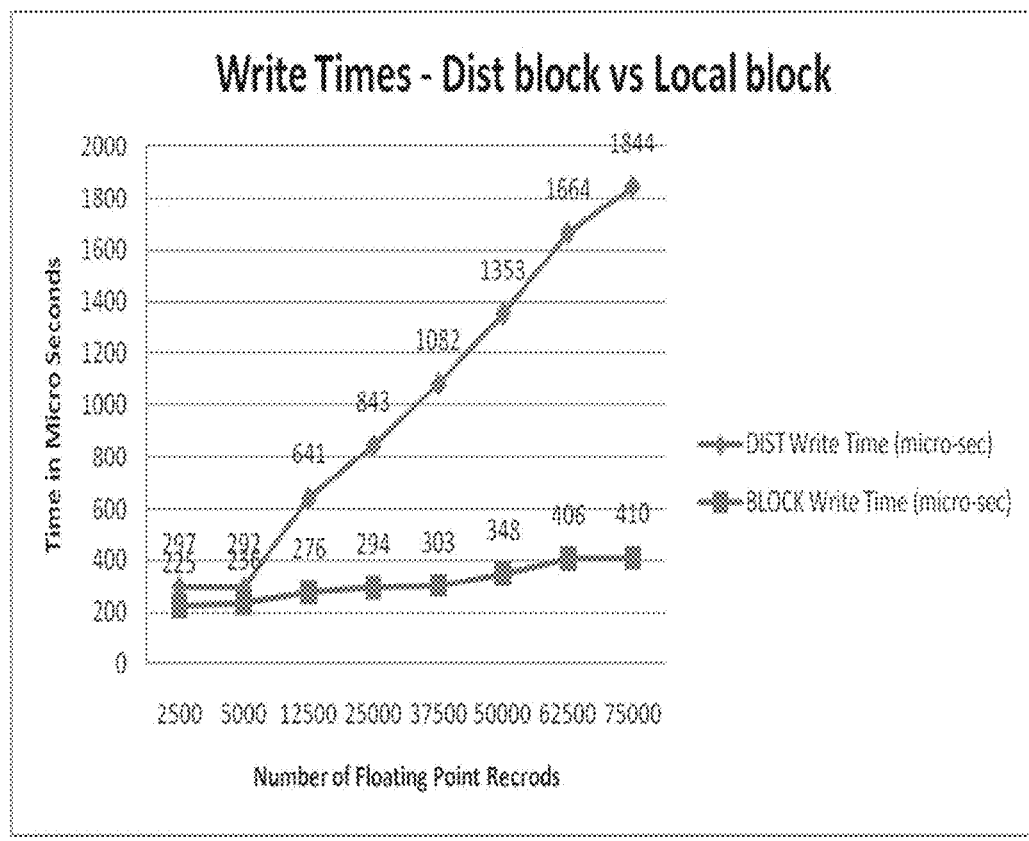
FIG. 7 is a graph showing distributed data ingestion performance of one embodiment of the present invention compared to traditional systems.

As can be seen from the graph of FIG. 7, the distributed version takes up more time compared to the local version of the system. The main reason for the increase in time was the network connection. Blocks of data containing 2500, 5000, and 12500 values were sent. It was found that these data blocks were often not sent on first go. There had to be retransmissions, which further increases the time required by the data server to receive data. It may be that by using more specialized transmission mechanisms and fast network connections, like gigabit Ethernet, these will be greatly reduced, making the system more efficient, reliable and scalable. As can be seen from the graph of FIG. 7, the rate of increase in the local version of the system with an increase in data size was negligible. It takes only about 410 microseconds on average to write 75000 values to the disk.

Figure 8:
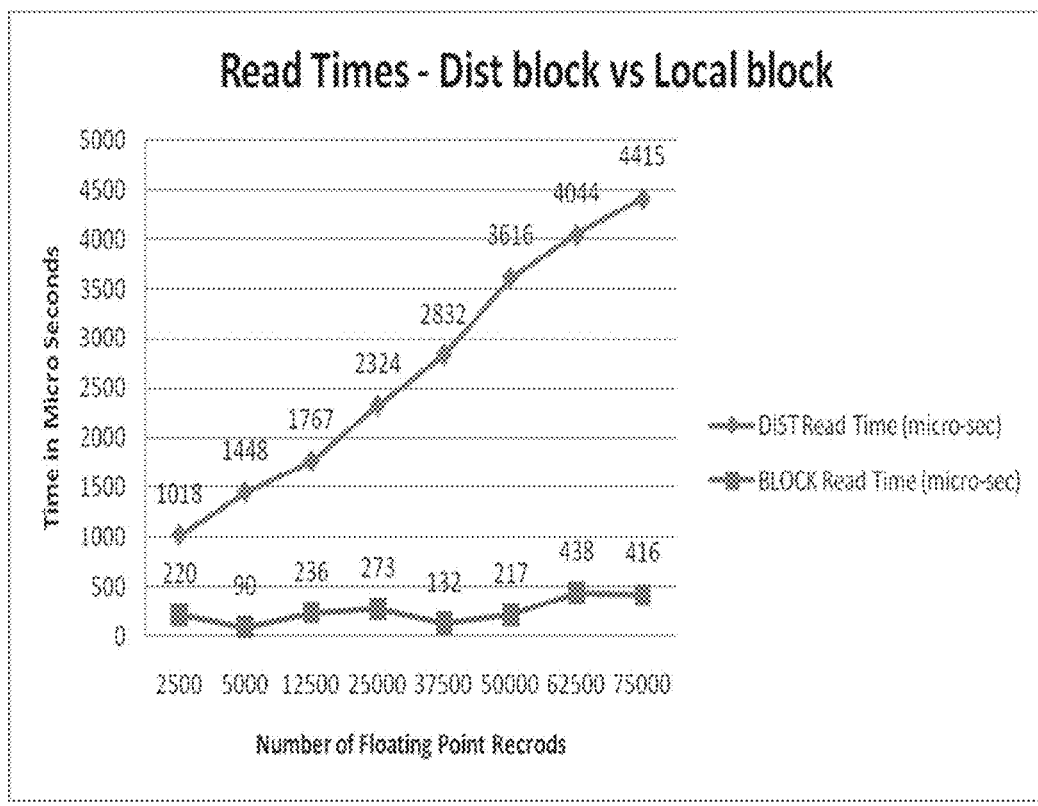
FIG. 8 is a graph showing distributed data retrieval performance of the present invention compared to traditional systems.

In addition to measuring write times, read times were also measured for the local and distributed versions of the system. It was found that even the read times were significantly better for the local version when compared to the distributed version of the system. The reason may be again that data servers have to transmit data read from the disk back to the distribution server which causes network delays. As can be seen in FIG. 8, the difference between read times of the two versions is greater compared to that of the write times. This is mainly due to the way these two versions or services are implemented. When distribution server sends write requests to data servers, it is completely parallel—meaning that data is divided into multiple blocks. Threads simultaneously send data to the servers. But in case of reading data back from data servers, it does not happen in a parallel fashion. A reason being that when data is sent to the client it is sent in such a ways as to look like one big block. But that data is distributed on data servers and needs to be collected and sequentially combined by the distribution server. So to make the implementation of the prototype easier, requests to read data are sent in a parallel fashion and rad sequentially one after the other. This eliminates the need to re-organize the data.

The system includes a reliable real time data management layer that stores, retrieves, and delivers data for power grid analysis and control applications in real time. A data management layer is scalable to handle millions of sensors including PMUs and smart meters while providing high availability and real time QoS guarantees.

The system includes a log inspired storage structure and specialized indexes to speed up data retrievals, and it can limit the number of disk operations needed by most data retrieval tasks to one. Results from controlled and preliminary experiments show that the system reduces latency, increases throughput significantly, and provides consistent performance.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

We claim:

1. A method of managing time-series data for smart grids, comprising:
    a. collecting data from a plurality of sensors;
    b. modifying an index for a newly created block; and
    c. performing a one disk operation per read or write.

2. The method of claim 1 further comprising adding a look-up capability to the index.

3. The method of claim 1 wherein the index is stored in at least one of the following: main memory of a local machine, main memory from a remote machine, a solid-state storage device (SSD) from the local machine, and the SSD from the remote machine.

4. The method of claim 1 wherein the performing a one disk operation per read comprises accessing and looking up the index to locate the data without movement of an arm of a disk, and obtaining the data.

5. The method of claim 1 wherein the performing a one disk operation per write comprises searching a disk for free space, calculating an offset, modifying the index, and writing the data contiguously into a block of the disk the index points to.

6. The method of claim 5 wherein the data is first written into a main memory buffer before being written into the disk.

7. The method of claim 1 wherein the collecting data from a plurality of sensors further comprises organizing the data contiguously in a disk.

8. The method of claim 7 wherein the data is reorganized contiguously in main memory before being written into the disk.

9. The method of claim 1 further comprising estimating a number of disk operations and staying below a maximum storage capacity.

10. The method of claim 1 further comprising distributing the data into multiple disks to enhance efficiency and reliability.

11. The method of claim 1 wherein the data is power grid data.

12. A system for scalable real time data management for smart grids comprising:
   a. data collected from a plurality of sensors;
   b. an index for data retrieval via one disk access;
   c. a disk including data blocks for storage of the data; and
   d. a device for caching the data, wherein the index is stored in the device.

13. The system of claim 12 wherein the data is collected in a time series format and organized contiguously in the disk.

14. The system of claim 12 wherein the index includes a look-up capability.

15. The system of claim 12 wherein the data is distributed into multiple disks to enhance efficiency and reliability.

16. The system of claim 12 wherein the index keeps track of stored data.

17. The system of claim 16 wherein the index keeps track of and looks up free disk space.

18. The system of claim 12 wherein the device is at least one of the following: main memory of a local machine, main memory from a remote machine, a solid-state storage device (SSD) from the local machine, and the SSD from the remote machine.

19. The system of claim 12 wherein the system performs one disk operation per read or write.

20. The system of claim 12 wherein the data is reorganized contiguously in main memory before being written into the disk.

21. The system of claim 12 wherein the data is power grid data.

22. A method of managing time-series data for smart grids, comprising:
   a. collecting data from a plurality of sensors;
   b. organizing the data contiguously in a disk;
   c. modifying an index for a newly created block;
   d. adding a look-up capability to the index; and
   e. estimating a number of disk operations and staying below a maximum storage capacity; wherein the data is collected in a time series format and first written into a main memory buffer before being written into the disk.

* * * * *